United States Patent
Baldischweiler

(10) Patent No.: US 12,242,910 B2
(45) Date of Patent: Mar. 4, 2025

(54) METHOD FOR PRODUCING A CHIP CARD, CARD BODY FOR A CHIP CARD, AND CHIP CARD

(71) Applicant: GIESECKE+DEVRIENT EPAYMENTS GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/263,999

(22) PCT Filed: Feb. 2, 2022

(86) PCT No.: PCT/EP2022/025034
§ 371 (c)(1),
(2) Date: Aug. 2, 2023

(87) PCT Pub. No.: WO2022/167150
PCT Pub. Date: Aug. 11, 2022

(65) Prior Publication Data
US 2024/0127023 A1      Apr. 18, 2024

(30) Foreign Application Priority Data
Feb. 3, 2021 (DE) .................... 10 2021 000 556.2

(51) Int. Cl.
*G06K 19/077*      (2006.01)
(52) U.S. Cl.
CPC . *G06K 19/07749* (2013.01); *G06K 19/07745* (2013.01)

(58) Field of Classification Search
CPC .......... H05K 2201/10727; H05K 2201/10636; H05K 2201/10515; H05K 2203/049;
(Continued)

(56) References Cited

U.S. PATENT DOCUMENTS

| 5,996,897 A | * | 12/1999 | Prancz | ............. G06K 19/07749 257/679 |
| 2006/0273181 A1 | * | 12/2006 | Charlier | ............... G06K 19/047 235/492 |

FOREIGN PATENT DOCUMENTS

| DE | 19749650 C2 | 1/2000 |
| EP | 0842491 B1 | 6/2005 |

(Continued)

OTHER PUBLICATIONS

Marchan, "Opto-electronic DNA chip-based integrated card for clinical diagnostics" (Year: 2007).*
(Continued)

*Primary Examiner* — Thien T Mai
(74) *Attorney, Agent, or Firm* — Workman Nydegger

(57) ABSTRACT

A method for producing a chip card, such that the chip card includes a card body and a chip module arranged thereon. The method has the steps of providing a card body; producing a cavity for receiving the chip module; producing at least one component opening for each of one or more electronic components in an overlap region, which is covered by the chip module arranged later; applying soldering material onto the electronic component(s), into the at least one component opening, and/or onto a lower face of the chip module; placing the electronic component(s) in the at least one component opening; introducing the chip module into the cavity; and heating the soldering material.

11 Claims, 3 Drawing Sheets

(58) Field of Classification Search
CPC . H05K 2201/0959; H05K 2201/10287; H05K 2203/061; G06K 19/07749; G06K 19/07745; G06K 19/07728; G06K 19/07743; G06K 19/07724; G06K 19/07754; G06K 19/0772; G06K 19/077
See application file for complete search history.

(56) References Cited

FOREIGN PATENT DOCUMENTS

| EP | 3474639 A1 * | 4/2019 | ......... H01L 21/4857 |
|---|---|---|---|
| JP | 2002280744 A | 9/2002 | |
| WO | WO-03073812 A1 * | 9/2003 | ........... H05K 1/0218 |

OTHER PUBLICATIONS

Dianat, "A Planar Switchable Capacitor with Embedded Two-dimensional Electron System for Higher Integrations in VLSI and RFIC" (Year: 2012).*

German Search Report from corresponding DE Application No. 102021000556.2, Sep. 20, 2021.

International Search Report from corresponding PCT Application No. PCT/EP2022/025034, May 17, 2022.

* cited by examiner

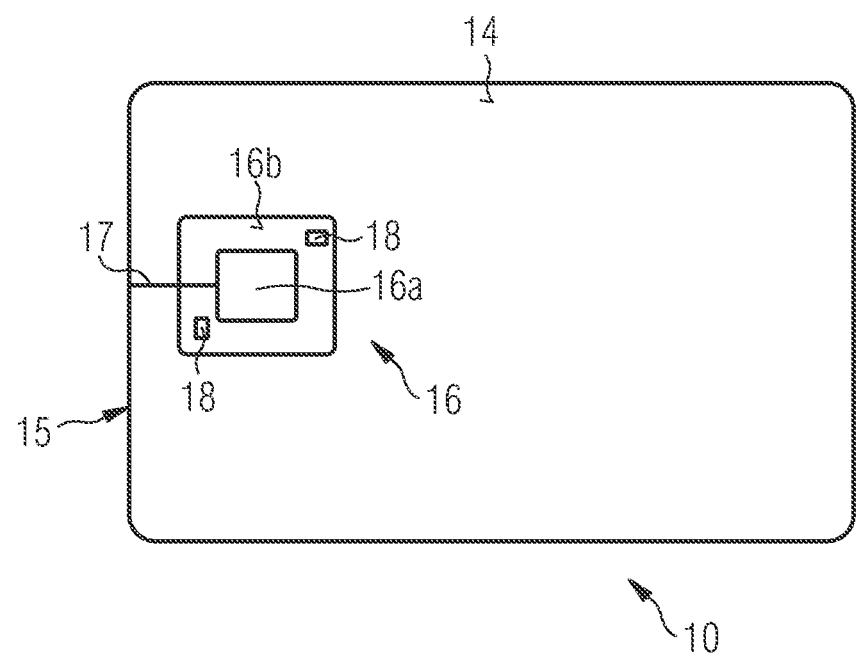
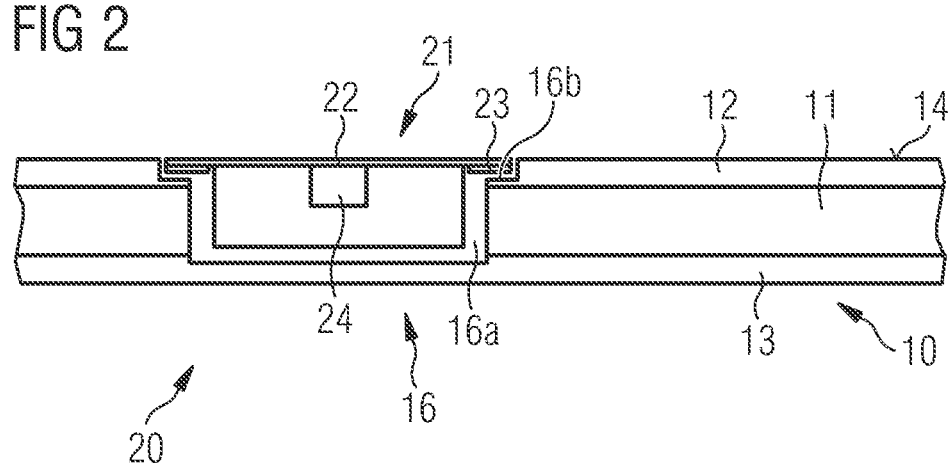

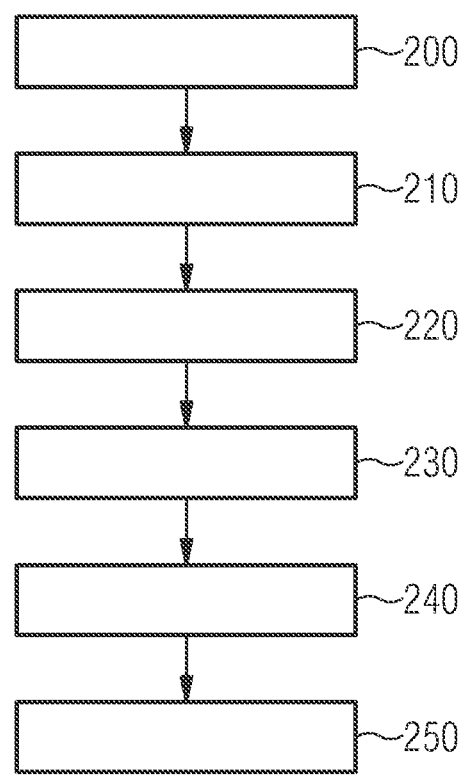

METHOD FOR PRODUCING A CHIP CARD, CARD BODY FOR A CHIP CARD, AND CHIP CARD

BACKGROUND

The invention relates to a method for producing a chip card, to a card body for a chip card and to a chip card.

Data carriers in chip form, in particular chip cards, are used in many fields, for example to carry out cashless payment transactions, as identity documents or to verify access authorizations. A chip card has a card body and an integrated circuit embedded in the card body, for example in the form of a chip module having a chip. The chip module is inserted into a cavity or module opening of the card body.

In what follows, chip modules or chip cards having an integrated coil, which allow non-contact or contactless communication, will be considered. For example, chip card controllers having an RFID functionality may be used. The coil forms, with an additional capacitor, a resonant circuit on the chip module.

Card bodies having a metallic core in the form of a metallic core layer or of a metallic core element may additionally be considered, as well as cards having a dual interface (DI) functionality, in which the card body partly or entirely consists of metal. The functionality of such a card consists in using a chip module that itself contains a coil (Coil On Module). This coil couples onto the metallic card body.

In practice, it has been found that the communication with the reading devices, in particular according to the RFID standard, is often poor.

Chip card controllers having a capacitance of 78 pF are used in order to keep mismatching of the resonant circuit as small as possible. Nevertheless, there is often mismatching of the resonant circuit. The overall system is capacitive and generates an apparent power. This means that energy absorbed from the field is not fully delivered to the chip card controller.

For the mounting of components, the soldering process or the reflow method may be used as a standard process. The constituent parts for this production process are economical. A disadvantage of this method is that the production of a chip module has to be carried out in multiple stages. Either the components are initially put onto the tape, and the chip and the encapsulation compound are applied in a second step, or the process steps are carried out in the reverse order.

As an alternative to this method, a bonding method may also be used for the constituent parts. These constituent parts, however, are more cost-intensive. The bonding method is more expensive, but offers the advantage that everything can be carried out in one process step. In the bonding method, the constituent parts are placed on the module in the process of equipping the chip module. Additional bonding wires are needed, and the production step per se takes longer. Another problem consists in the bonding wires themselves, which may tear due to bending of the module. In this case, total failure of the resonant circuit may take place if the wires on the constituent part tear.

SUMMARY

It is therefore an object of the present invention to simplify the communication between a chip module or chip card and the reading devices.

This object is achieved by a method for producing a chip card, by a card body for a chip card or by a chip card according to the independent patent claims. Configurations and developments of the invention are specified in the dependent claims.

A method according to the invention for producing a chip card, the chip card comprising a card body and a chip module arranged therein, provides the following steps:

providing a card body;
  excavating a cavity in order to receive the chip module;
  excavating at least one component opening respectively for one or more electronic components in an overlap region, which will be covered by the subsequently arranged chip module;
  applying solder onto the electronic component or components, into the at least one component opening and/or a lower side of the chip module;
  placing the electronic component or components in the at least one component opening;
  introducing the chip module into the cavity; and
  heating the solder.

An underlying concept of the present invention consists in arranging at least one additional electronic component, for example a discrete component such as a capacitor, in at least one component opening designed therefor. With this component, for example, power matching of the resonant circuit of the chip module or further signaling and/or supply optimizations may be carried out. The component opening is preferably formed separately from the cavity. The component opening and the cavity may be produced in one working step, for example by means of a milling process or a laser processing step.

The overlap region corresponds to the region of the layout of the card body, or of the chip card, in which the chip module is arranged. In this region, the at least one component opening is excavated before the chip module is arranged there. The overlap region may also comprise only an outer edge of the region covered by the chip module, for example the region of the turns of the coil of the chip module.

The method proposed here has the advantage that the soldering method may also be carried out during the chip embedding, that is to say the insertion of the chip module into the card body. This allows a one-stage production process, so that the otherwise necessary two-stage production process may be obviated.

The card body that is provided may comprise a metallic layer, for example of a stainless steel alloy, wherein the metallic layer may respectively be covered on both main faces with a cover layer of plastic such as PET, PC, PVC or PP. The card body that is provided may furthermore comprise a slit, running from the card edge to the cavity, in the metallic layer. This slit prevents short circuits and reduces eddy currents.

Provision may be made that the solder is applied on two opposite walls of the at least one component opening. This may, for example, be carried out by 2-needle injection. The component is then inserted with its two electrical terminals on the two walls.

Provision may furthermore be made that the electronic component or components are/is pre-fixed on the chip module with a resilient adhesive, and that the steps of placement and introduction are carried out simultaneously.

This may further simplify the manufacturing process per se, since the pre-fixing may be prepared non-critically in terms of time. For example, a silicone may be used as the adhesive.

Provision may be made that the solder is heated by one or more heating dies and subsequently cooled. For example, various working steps such as preheating, solder activation, bonder activation and single or multiple cooling may be provided.

A method according to the invention for producing a chip card, the chip card comprising a card body and a chip module arranged therein, provides the following steps:
providing a card body;
excavating a cavity in order to receive the chip module;
excavating at least one component opening respectively for one or more electronic components in an overlap region, which will be covered by the subsequently arranged chip module;
applying electrically conductive bonder onto the electronic component or components, into the at least one component opening and/or a lower side of the chip module;
placing the electronic component or components in the at least one component opening; and
introducing the chip module into the cavity.

This method is also based on the underlying concept that at least one additional electronic component, for example a discrete component such as a capacitor, is arranged in at least one component opening designed therefor. In this method, the solder, such as a solder paste, and the soldering process are obviated. In other regards, the same advantages and modifications as described above apply.

Provision may be made that before the placement of the electronic component or components, a resilient medium is introduced into the component opening. By a small amount of a resilient medium, such as a small drop of silicone, the component is gently supported and therefore generates a good application pressure onto the bonder and onto the module.

Provision may furthermore be made that a blind hole is excavated in the cavity for receiving a part of the chip module, and that the chip module is introduced into the cavity and the blind hole. For example, a chip of the chip module, which is embedded in an encapsulation compound, may be introduced into the blind hole. In the case of flip-chip mounting of the chip module, a blind hole may be obviated.

A card body according to the invention for a chip card comprises a cavity configured to receive a chip module and comprises at least one component opening in a main face of the card body, respectively configured to receive one or more electronic components, the at least one component opening being arranged in an overlap region, which is configured in such a way that it will be covered by the chip module that can subsequently be arranged on the card body.

The overlap region and the cavity may have identical dimensions. In this case, the at least one component opening is formed in the cavity. Furthermore, the same advantages and modifications as described above apply.

Provision may be made that a blind hole configured to receive a part of the chip module is excavated in the cavity, and that the overlap region is arranged between the blind hole and an edge of the cavity. For example, a chip of the chip module, which is embedded in an encapsulation compound, may be introduced into the blind hole. In the case of flip-chip mounting of the chip module, a blind hole may be obviated.

Provision may furthermore be made that the at least one component opening is formed separately from the blind hole. In this way, each component opening may be matched precisely to the respective component or constituent part. The depth of the component opening may be dimensioned in such a way that the inserted component comes into electrical contact with a conductor of the chip module.

A chip card according to the invention comprises a card body as described above, a chip module arranged on the chip card and at least one electronic component, which is arranged in the at least one component opening. The same advantages and modifications as described above apply.

BRIEF DESCRIPTION OF THE DRAWINGS

The present invention will be described below by way of example with reference to the appended drawings, in which
FIG. 1: shows a plan view of a card body for a chip card;
FIG. 2: shows a sectional representation of a chip card having a card body and a chip module;
FIG. 5: shows a flowchart of a second method for producing a chip card.

DETAILED DESCRIPTION OF VARIOUS EMBODIMENTS

Figure 3:
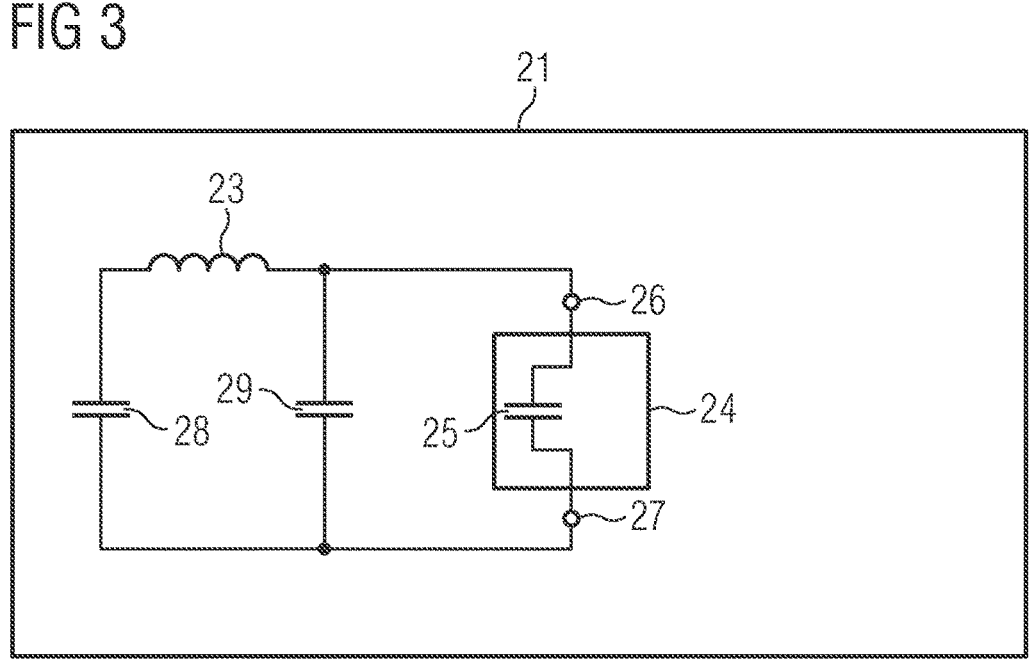
FIG. 3: shows a circuit diagram of a chip module of the chip card.

FIG. 1 shows a card body 10 for a chip card. The card body 10 has a metallic layer 11, the main faces of which are respectively covered with a plastic layer 12 and 13 (FIG. 2).

The card body 10 has two opposite main faces, of which one main face 14 can be seen in FIG. 1. The main face 14 is bounded by a circumferential face 15 extending around, or an edge. The metallic layer 11 may, for example, be in the form of a core or a layer of a stainless steel alloy, for example having a thickness of 400 µm. The thickness of the card body 10 may, for example, be between 50 µm and 920 µm.

A module opening or cavity 16 for a chip module is excavated in the main face 14 of the card body 10. The cavity 16 comprises a central blind hole 16a and an edge region or overlap region 16b extending around. The overlap region 16b corresponds to the region of the layout of the card body 10, or of the chip card, in which the chip module is arranged.

Provided in the metallic layer 11, there is a slit 17 which extends from the circumferential face 15, or in other words from an outer edge of the card body 10, to the cavity 16. The slit 17 therefore connects the cavity 16 to the circumferential face 15.

In FIG. 1, the slit 17 is represented on a left side. The slit 17 may also be arranged on a right, upper or lower side of the card body 10. The slit 17 is used to avoid short-circuit currents or eddy currents.

In the overlap region 16b, at least one component opening 18 is excavated in the main face 14 of the card body 10. In this example, two component openings 18 are provided, although more component openings 18 are possible, for example from 3 to 5.

The component opening 18 is especially formed in order to receive one or more electronic components. With this component, for example, power matching of the resonant circuit of the chip module or further signaling and/or supply optimizations may be carried out. The component may, for example, be a capacitor. For example, components with the size 0402 (0.6×0.3 mm) may be used.

The component opening 18 is formed independently of the blind hole 16a both in the physical arrangement and in the function. The at least one component opening 18 is formed in a bottom face of the cavity 16, here in the overlap region 16b. The overlap region and the cavity may have identical dimensions.

FIG. 2 shows a sectional representation of a chip card 20 having a chip module 21 and a card body 10.

The cavity 16 is excavated only to a part of the depth of the plastic layer 12. The overlap region 16b is formed in the plastic layer 12. The blind hole 16a extends through the entire plastic layer 12, the entire metallic layer 11 and a part of the plastic layer 13. The cavity 16 and the blind hole 16a are, for example, created by means of a laser working step or milling working step. The component opening (not represented here) may also be created in this working step.

The chip module 21 is arranged in the cavity 16 and the blind hole 16a, and for example adhesively bonded there. The chip module 21 comprises a contact face structure 22, which carries a coil 23. The coil 23 may be arranged on a module tape (not represented here). The contact face structure 22 lies on the plastic layer 12 in the overlap region 16b of the cavity 16.

The coil 23 may for instance have from 12 to 16 turns, which run concentrically around the chip 24 here. The width of a turn may be from 50 µm to 70 µm, and the distance between two turns may be 100 µm. The turns may have copper thicknesses of up to about 30 µm. With such a coil, a maximum of 2.5 µH may be achieved.

For a higher inductance, a multilayer coil may be provided. This may be produced by additional turns on the upper side of the chip module or by means of a multilayer circuit board. In the case of the multilayer circuit board, a further coil or further turns of a coil are introduced in an intermediate layer of the multilayer circuit board.

By the addition of a second winding plane, the limitation of the restricted space of the chip module may be overcome and a higher inductance may be provided.

The chip module 21 furthermore comprises a chip 24, for example in the form of an integrated circuit, which is fastened for example in an encapsulation compound on a lower side of the contact face structure 22. The chip 24 is supplied with energy and/or signals via the coil 23. Thus, an electromagnetic field emanating from the metallic layer 11 may be coupled into the coil 23. For example, the chip 24 may be or contain a chip card controller having an RFID functionality.

FIG. 3 shows a circuit diagram of the chip module 21 of the chip card 20. The chip module 21 comprises the chip 24, for example in the form of an integrated circuit. The chip 24 may, for example, be soldered onto the chip module 21 or may have been applied onto the chip module 21 by flip-chip mounting. The chip 24 contains a card controller for the chip card 20. The chip 24 conventionally contains a processor for executing control functions for the chip card 20 and for the communication and for executing calculation operations, for example for security functions. The chip 24 furthermore contains a memory region for storing data and/or making data available.

The chip 24 furthermore comprises a capacitor 25 having a capacitance of, for example, 78 pF. The coil 23 is connected in parallel with the chip 24 and has a maximum inductance of 3.5 µH in the case of the coil 23 in one plane represented in FIG. 2. In the case of a coil having two planes, the inductance may be more than 3.5 µH.

The coil 23 and the internal capacitor 25 of the chip 24 form a resonant circuit. With the aid of this resonant circuit, the chip module 21 can communicate with a reading device external to the chip card 20.

Here, power matching of the chip module 21 to an external reading device is carried out. The aim is to match the coil 23 to the chip 24 so that on the one hand the quality of the resonant circuit is increased and on the other hand the apparent and reactive powers are minimized. Furthermore, the resonant frequency of the resonant circuit is matched to the resonant frequency of the reading device.

In this example, an RFID reading device that has a resonant frequency of 13.56 MHz is assumed.

In the course of the power matching, the inductance may be made to be as high as possible, even beyond 2.6 µH. This is important for the introduction of energy into the chip module 21 or the chip 24 and for the quality.

The coil 23 is connected between two contact points, or terminals 26 and 27. The terminals 26 and 27 may be terminals of the chip 24, contact points on a circuit board or theoretical node points. The coil 23 is connected in parallel with the terminals 26 and 27.

Furthermore, in the course of the power matching, a component 28 external to the chip 24 is provided, here in the form of a first power matching capacitor, which is arranged in series with the coil 23. The first and further power matching capacitors may compensate for the apparent power. For example, from one to five, in particular from two to three, power matching capacitors may be provided.

Depending on the inductance of the coil 23, a capacitor value of between 10 pF and 200 pF is provided. The power matching capacitor 28 may be connected as an external component either by means of a soldering process or a bonding process onto the module tape. If the required capacitor value is less than 20 pF, it may also be formed on the chip module 21 by means of unused module pads, for example C4, C5 and/or C7. This is possible above all when a multilayer tape is used.

The matching of the chip module 21 or of the resonant circuit together with the power matching capacitor 28 may be carried out to a resonant frequency of the resonant circuit of between 13 MHz and 14 MHz, and preferably 13.56 MHz, so that the resonant frequency of the resonant circuit coincides with the resonant frequency of the reading device. In this case, the effects of the metallic layer 11 on the resonant circuit, in particular the coil 23, are taken into account.

While the first power matching capacitor 28 is arranged in series with the coil 23, a second power matching capacitor 29 is arranged in parallel with the chip 24, or with the terminals 26 and 27. Depending on the inductance of the coil, capacitor values of between 10 and 200 pF are required.

The two power matching capacitors or components 28 and 29 allow fine adjustment or matching of the resonant circuit.

By means of the power matching capacitors or components 28 and 29 introduced into the resonant circuit, on the one hand the target frequency is adjusted and on the other hand the reactive or apparent power is set as low as possible. Furthermore, the two capacitances should be selected in such a way that the Q factor is as high as possible, so that the resonant circuit has only weak damping. This may, for example, be carried out by means of a Smith chart.

This leads to a higher energy input, which allows a faster start-up of the processor or of the chip 24 and faster operation due to a higher operating frequency of the processor or of the chip 24.

The two power matching capacitors or components 28 and 29 are arranged in the component openings 18. The two components 28 and 29 may respectively be arranged in their own component opening 18, as represented in FIG. 1. It is likewise possible for the two components 28 and 29 to be arranged in a common component opening 18.

The component openings 18 are positioned in the card body 10 in such a way that these positions are congruent with the positions on the module tape at which the external components are soldered or electrically connected.

Figure 4:
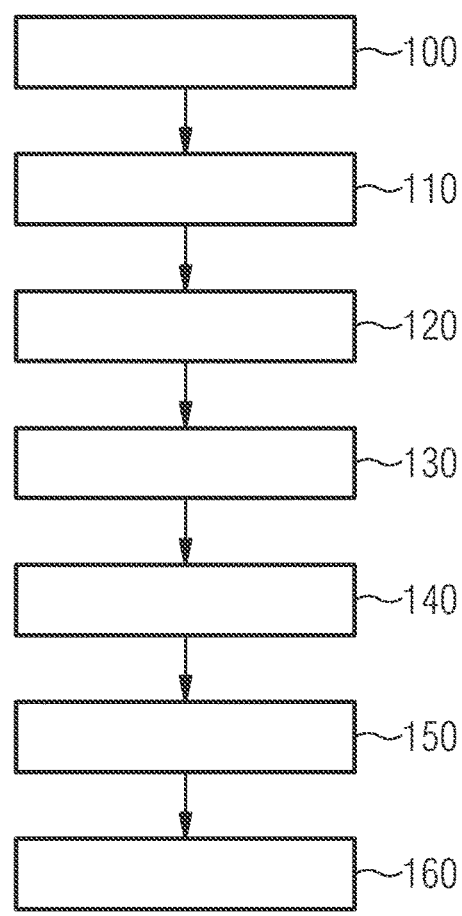
FIG. 4: shows a flowchart of a first method for producing a chip card.

FIG. 4 shows a flowchart of a first method for producing a chip card 20.

In a first step 100, the card body 10 is provided. The card body may comprise a central metallic layer 11, the main sides of which are each laminated with a plastic layer 12, 13. The slit 17 may already be excavated in the metallic layer 11.

In a second step 110, the cavity 16 for receiving the chip module 21 is excavated. The cavity 16 may comprise a blind hole 16a. The excavation or creation of the cavity 16 may be carried out by means of a milling device or a laser cutting machine.

In a third step 120, at least one component opening 18 respectively for one or more electronic components 28 and 29 is excavated in an overlap region 16b. The overlap region 16b may lie in the cavity 16, so that the component opening 18 is formed in a bottom face of the cavity 16. The overlap region 16b is overlapped by the subsequently arranged chip module 21. The second and third steps 110, 120 may be carried out in one working step, also referred to as a milling production step.

In order to obtain the placement at the correct position below the chip module 21, two additional recesses, the component openings 18, are milled here into the card body 10 in the region of the cavity 16. These positions are congruent with the position on the module tape at which the external components 28 and 29 are intended to be soldered.

In a fourth step 130, solder is applied onto the electronic component or components 28, 29, into the at least one component opening 18 and/or a lower side of the chip module 21. All possibilities allow an electrically conductive connection between the electronic components 28, 29 and the chip module 21.

A reflow soldering method such as the T-Connect method with a solder paste may be used in order to achieve soldering between two elements. Here, in the embedding process, the external component 28, 29 may now be provided with the solder paste before the placement. Likewise, for example, with 2-needle injection the solder paste may be introduced into the existing cavity 16 at the sides. It is also possible to already order the external component 28, 29 with solder paste applied. Alternatively, the chip module may also be applied with the solder paste, for example by means of a die (standard method to doctor blading).

In a fifth step 140, the electronic component or components 28, 29 are placed in the at least one component opening 18. The electronic components 28, 29 in the form of the additional capacitors may be delivered on a roll. This means that a gripper or suction pickup takes the components individually and can place them at any desired location, for example directly into the component openings 18. This may also be done with vacuum tweezers.

The electronic component or components 28, 29 may be pre-fixed on the chip module 21 with a resilient adhesive such as a silicone. The electronic components 28, 29 are then inserted together with the chip module 21, so that the steps of placement 140 and introduction 150 are carried out simultaneously.

In a sixth step 150, the chip module 21 is introduced into the cavity 16. This may, for example, be done with a die. The chip module 21 is now located in the overlap region 16b and covers the electronic components 28, 29, which are located in the component opening or openings 18.

In a seventh step 160, the solder is heated. The solder may be heated by one or more heating dies and subsequently cooled. With the heating die, the component 28, 29 is now soldered onto the chip module 21 by means of the solder paste. Since the solder paste contracts during the melting process, the component 28, 29 is drawn onto the circuit board. For example, various working steps such as preheating, solder activation, bonder activation and single or multiple cooling may be provided.

FIG. 5 shows a flowchart of a second method for producing a chip card 20. In the second method, an electrically conductive bonder is used instead of solder. In this case, the solder paste as well as the soldering process are obviated.

In a first step 200, the card body 10 is provided. The card body may comprise a central metallic layer 11, the main sides of which are each laminated with a plastic layer 12, 13. The slit 17 may already be excavated in the metallic layer 11.

In a second step 210, the cavity 16 for receiving the chip module 21 is excavated. The cavity 16 may comprise a blind hole 16a. The excavation or creation of the cavity 16 may be carried out by means of a milling device or a laser cutting machine.

In a third step 220, at least one component opening 18 respectively for one or more electronic components 28 and 29 is excavated in an overlap region 16b. The overlap region 16b may lie in the cavity 16, so that the component opening 18 is formed in a bottom face of the cavity 16. The overlap region 16b is overlapped by the subsequently arranged chip module 21. The second and third steps 110, 120 may be carried out in one working step, also referred to as a milling production step.

In order to obtain the placement at the correct position below the chip module 21, two additional recesses, the component openings 18, are milled here into the card body 10 in the region of the cavity 16. These positions are congruent with the position on the module tape at which the external components 28 and 29 are intended to be soldered.

In a fourth step 230, electrically conductive bonder is applied onto the electronic component or components 28, 29, into the at least one component opening 18 and/or a lower side of the chip module 21. All possibilities allow an electrically conductive connection between the electronic components 28, 29 and the chip module 21.

A connection with a conductive bonder, in particular with silicone bonders, is resilient and therefore mechanically more robust. Conductive bonders consist of an adhesive such as a resin and electrically conductive fillers. The fillers that are highly suitable include for example silver (silver conductive bonder), gold, palladium, nickel and platinum.

In a fifth step 240, the electronic component or components 28, 29 are placed in the at least one component opening 18. The electronic components 28, 29 in the form of the additional capacitors may be delivered on a roll. This means that a gripper or suction pickup takes the components individually and can place them at any desired location, for example directly into the component openings 18. This may also be done with vacuum tweezers.

The electronic component or components 28, 29 may be pre-fixed on the chip module 21 with a resilient adhesive such as a silicone. The electronic components 28, 29 are then inserted together with the chip module 21, so that the steps of placement 240 and introduction 250 are carried out simultaneously.

In a sixth step 250, the chip module 21 is introduced into the cavity 16. This may, for example, be done with a die. The chip module 21 is now located in the overlap region 16*b* and covers the electronic components 28, 29, which are located in the component opening or openings 18.

The invention claimed is:

1. A method for producing a chip card, the chip card comprising a card body and a chip module arranged thereon, having the steps:
   providing a card body;
   excavating a cavity in order to receive the chip module;
   excavating at least one component opening respectively for one or more power matching components in an overlap region and in a bottom face of the cavity such that the at least one component opening is covered by the subsequently arranged chip module, wherein the respective power matching component is a capacitor;
   applying solder onto the power matching component or components, into the at least one component opening and/or a lower side of the chip module;
   placing the power matching component or components in the at least one component opening;
   introducing the chip module into the cavity; and
   heating the solder.

2. The method according to claim 1, wherein the solder is applied on two opposite walls of the at least one component opening.

3. The method according to claim 1, wherein the power matching component or components are pre-fixed on the chip module with a resilient adhesive, and in that the steps of placement and introduction are carried out simultaneously.

4. The method according to claim 1, wherein the solder is heated by one or more heating dies and subsequently cooled.

5. A method for producing a chip card, the chip card comprising a card body and a chip module arranged thereon, having the steps:
   providing a card body;
   excavating a cavity in order to receive the chip module;
   excavating at least one component opening respectively for one or more power matching components in an overlap region and in a bottom face of the cavity such that the at least one component opening is covered by the subsequently arranged chip module wherein the respective power matching component is a capacitor;
   applying electrically conductive bonder onto the power matching component or components, into the at least one component opening and/or a lower side of the chip module;
   placing the power matching component or components in the at least one component opening; and
   introducing the chip module into the cavity.

6. The method according to claim 3, wherein before the placement of the power matching component or components, a resilient medium is introduced into the at least one component opening.

7. The method according to claim 1, wherein a blind hole is excavated in the cavity for receiving a part of the chip module, and in that the chip module is introduced into the cavity and the blind hole.

8. A card body for a chip card, having a cavity configured to receive a chip module and having at least one component opening in a main face of the card body, respectively configured to receive one or more power matching components, the at least one component opening being arranged in an overlap region and in a bottom face of the cavity such that the at least one component opening is configured to be covered by the chip module that is subsequently arranged on the card body, wherein the respective power matching component is a capacitor.

9. The card body according to claim 8, wherein a blind hole configured to receive a part of the chip module is excavated in the cavity, and in that the overlap region is arranged between the blind hole and an edge of the cavity.

10. The card body according to claim 8, wherein the at least one component opening is formed separately from the blind hole.

11. A chip card having a card body according to claim 8, a chip module arranged on the chip card and at least one power matching component that is arranged in the at least one component opening.

* * * * *